(12) United States Patent
Zacche' et al.

(10) Patent No.: US 7,755,237 B2
(45) Date of Patent: Jul. 13, 2010

(54) MOTOR FOR DRIVING A CONTAINER-HOLDER PLATE IN A LABELLING MACHINE

(75) Inventors: Vanni Zacche', Roncoferraro (IT); Antonio Secchi, Campegine (IT)

(73) Assignee: Sidel Holdings & Technology S.A., Pully (CH)

( * ) Notice: Subject to any disclaimer, the term of this patent is extended or adjusted under 35 U.S.C. 154(b) by 17 days.

(21) Appl. No.: 11/756,787

(22) Filed: Jun. 1, 2007

(65) Prior Publication Data
US 2007/0284958 A1 Dec. 13, 2007

(30) Foreign Application Priority Data
Jun. 6, 2006 (EP) .................... 06425383

(51) Int. Cl.
*H02K 5/00* (2006.01)
(52) U.S. Cl. ............ 310/89; 310/60 A; 310/60 R; 310/75 D; 310/75 R; 310/67 R; 310/58; 310/219; 310/80; 418/61.3
(58) Field of Classification Search ............ 310/71, 310/89, 90, 68 R, 91, 60 A, 60 R, 75 D, 75 R, 310/58, 219, 80; 418/61.3; *H02K 5/00*
See application file for complete search history.

(56) References Cited

U.S. PATENT DOCUMENTS

| | | | | |
|---|---|---|---|---|
| 4,511,025 A * | 4/1985 | Nakayama | ............ | 198/377.08 |
| 5,121,019 A * | 6/1992 | Pradler | ............ | 310/83 |
| 5,613,593 A * | 3/1997 | Gerber | ............ | 198/479.1 |
| 6,204,585 B1 * | 3/2001 | Riello et al. | ............ | 310/159 |
| 6,617,713 B1 * | 9/2003 | Li | ............ | 310/52 |
| 6,657,338 B2 * | 12/2003 | Fisher et al. | ............ | 310/89 |
| 6,707,185 B2 * | 3/2004 | Akutsu et al. | ............ | 310/71 |
| 6,707,189 B2 * | 3/2004 | Ito et al. | ............ | 310/75 R |
| 6,710,482 B2 * | 3/2004 | Mackulin et al. | ............ | 310/75 R |
| 6,794,779 B2 * | 9/2004 | Ma et al. | ............ | 310/80 |
| 6,914,362 B2 * | 7/2005 | Lungu | ............ | 310/219 |
| 7,048,658 B2 * | 5/2006 | Butsch et al. | ............ | 474/23 |
| 7,199,497 B2 * | 4/2007 | Tessier et al. | ............ | 310/90 |
| 7,538,458 B2 * | 5/2009 | Soitu | ............ | 310/58 |
| 2004/0131483 A1 * | 7/2004 | Voulgaris | ............ | 417/410.3 |
| 2005/0258701 A1 * | 11/2005 | Soitu | ............ | 310/179 |
| 2005/0265881 A1 * | 12/2005 | Davidson et al. | ............ | 418/61.3 |
| 2006/0232147 A1 * | 10/2006 | Cheng | ............ | 310/52 |
| 2008/0012447 A1 * | 1/2008 | Snelick et al. | ............ | 310/261 |

FOREIGN PATENT DOCUMENTS

| | | |
|---|---|---|
| DE | 10018728 | 10/2001 |
| GB | 2110624 | 6/1983 |

* cited by examiner

*Primary Examiner*—Quyen Leung
*Assistant Examiner*—John K Kim
(74) *Attorney, Agent, or Firm*—Shoemaker and Mattare (57) ABSTRACT

A motor for a plate of a labelling machine comprises a housing with a connecting portion for connecting the motor to a carousel of the labelling machine, a motor shaft pivotally supported within the housing, a coupling flange having a first end connected to the motor shaft and a second end that can be connected to the plate. The motor defines a through opening, which is substantially parallel to the motor shaft that allow alignment means to have access to the plate through the motor.

13 Claims, 6 Drawing Sheets

MOTOR FOR DRIVING A CONTAINER-HOLDER PLATE IN A LABELLING MACHINE

FIELD OF THE INVENTION

The present invention relates to a motor for driving a container-holder plate in a labelling machine. Particularly, the invention relates to a container-holder plate for a rotary labelling machine of the type comprising a carrousel supporting a plurality of container-holder plates (simply called the "plates", hereinafter) along the periphery thereof, wherein the carrousel can be pivotally driven by a carrousel motor in order to be able to place each individual plate in the carrousel at one or more labelling stations arranged about the carrousel, and wherein a drive motor is associated with each plate, which is suitable to turn the plate about the axis thereof, in order to allow placing the bottle, or generally the container supported by the plate in those angular positions as required to apply the label. The invention further relates to a plate-motor unit for rotary labelling machines, as well as a rotary labelling machine.

In order to achieve a satisfactory labelling, such as of containers different from one another, containers having a non-cylindrical shape and containers having, in addition to the label, further ornamental or technical accessories which require the label to be positioned based on the position of the further accessory, labelling machines are provided with alignment means which control the angular position of the containers placed on the plates, such as to properly orientate the containers when they are conveyed to the labelling stations.

BACKGROUND OF THE INVENTION

Electric motors have been proposed for driving the plates, such as direct current, alternate current or three-phase motors. These motors can be of the synchronous, asynchronous or stepping types. These electric motors are firmly connected to the plate, such as by means of a so-called coupling flange and a plate support, which, by being connected between the end of the motor shaft and the plate, provide a (rotatably integral) serial connection between the motor shaft and the plate.

Said alignment means for controlling the angular position of the containers to be labelled can comprise optical sensors, such as photocells or video cameras suitable to detect a mark (such as a line, a projection, or a groove) provided in each container or process more complex reference images. Alternatively, the alignment means for the containers to be labelled can comprise mechanical devices suitable to align the container at an angle relative to the plate, in order to allow controlling the angular position of the container by monitoring and piloting the angular position of the motor shaft connected to the plate.

The application of reference marks on the visible surface of bottles has proved disadvantageous, both in terms of visual appearance, and because particular shapes of the bottles, such as very salient edges, etc., are likely to affect mark detection in a negative manner. It is thus desired to be able of arranging the reference marks on the bottom wall of the bottle. This bottom wall is substantially invisible when the bottle is being used and normally has a shape that is sufficiently even to avoid affecting the control of the angular position in a negative manner.

However, as in the case of labelling machines to which the present invention is referred, the bottom wall of the bottle is not always accessible, because the space below this bottom wall is occupied by the plate and drive motor associated with the plate.

This prevents the alignment means from having direct axial (either optical or mechanical) access to the bottom wall of the bottle.

A coaxial arrangement of the motor relative to the plate thus requires a crosswise access by the alignment means, and a direct, i.e. axial, access by the alignment means to the bottom wall of the container inevitably implies an eccentric positioning of the motor. Both solutions are bulky and require complex drive mechanisms.

It is accordingly the object of the present invention to provide a motor for a plate having such characteristics as to allow the same to be positioned relative to the plate and coupled thereto in a coaxial manner, while allowing the alignment means to have direct access to the bottom wall of the bottle.

GENERAL DESCRIPTION OF THE INVENTION

This and other objects are achieved by means of a plate motor in a labelling machine, comprising:
a support and containment structure provided with one or more connecting portions for connecting the motor to a carrousel of the labelling machine;
a motor shaft being pivotally supported within the support and containment structure;
a coupling flange having a first end connected to said motor shaft and a second end that can be connected to said plate, wherein the motor defines a through opening that is substantially parallel to the motor shaft and suitable to allow alignment means to have access to the plate through the motor.

Due to the through opening in the motor, the latter can be positioned relative to the plate and coupled thereto in a coaxial manner, while allowing the alignment means to have direct access (through the through opening) to the bottom wall of the bottle. When the labelling machine has been assembled, the motor and alignment means or other accessories are thus superimposed within the same available space, without any negative interference occurring to each other.

DESCRIPTION OF THE FIGURES

In order to better understand the invention and appreciate the advantages thereof, some exemplary non-limiting embodiments of the same will be described herein below, with reference to the annexed drawings, in which.

DETAILED DESCRIPTION OF EMBODIMENTS

With reference to the figures, a motor for a plate of a labelling machine is generally designated with the numeral 1. The motor 1 comprises a support and containment structure, i.e. a housing 2 with one or more connecting portions 3 for connecting the motor 1 to a carrousel 4 of a labelling machine (not shown). The motor 1 is preferably an electric motor with a stator 5, which is rotatably integrally fixed within the housing 2 and a rotor 6, such as a series of magnets, that is connected to a motor shaft 7. The motor shaft 7 is pivotally supported within the housing 2, due to one or more bearings 8, 9, 10 which allow the motor shaft 7 to rotate about an axis of rotation X and prevent the same to move axially and transversally relative to the axis of rotation X.

The motor 1 further comprises a coupling flange 11 with a first end 12 being connected to the motor shaft 7 and a second end 13 being provided with one or more seats 16 for connection to a plate 14.

Advantageously, the motor 1 defines a through opening 28, which is substantially parallel to the motor shaft 7 and suitable to allow alignment means or other accessories to have access to the plate through the motor 1. Particularly advantageously, the motor shaft 7 or a shaft-flange unit 15 (which will be described below) has a tubular shape and defines said through opening 28 therein.

Figure 1:
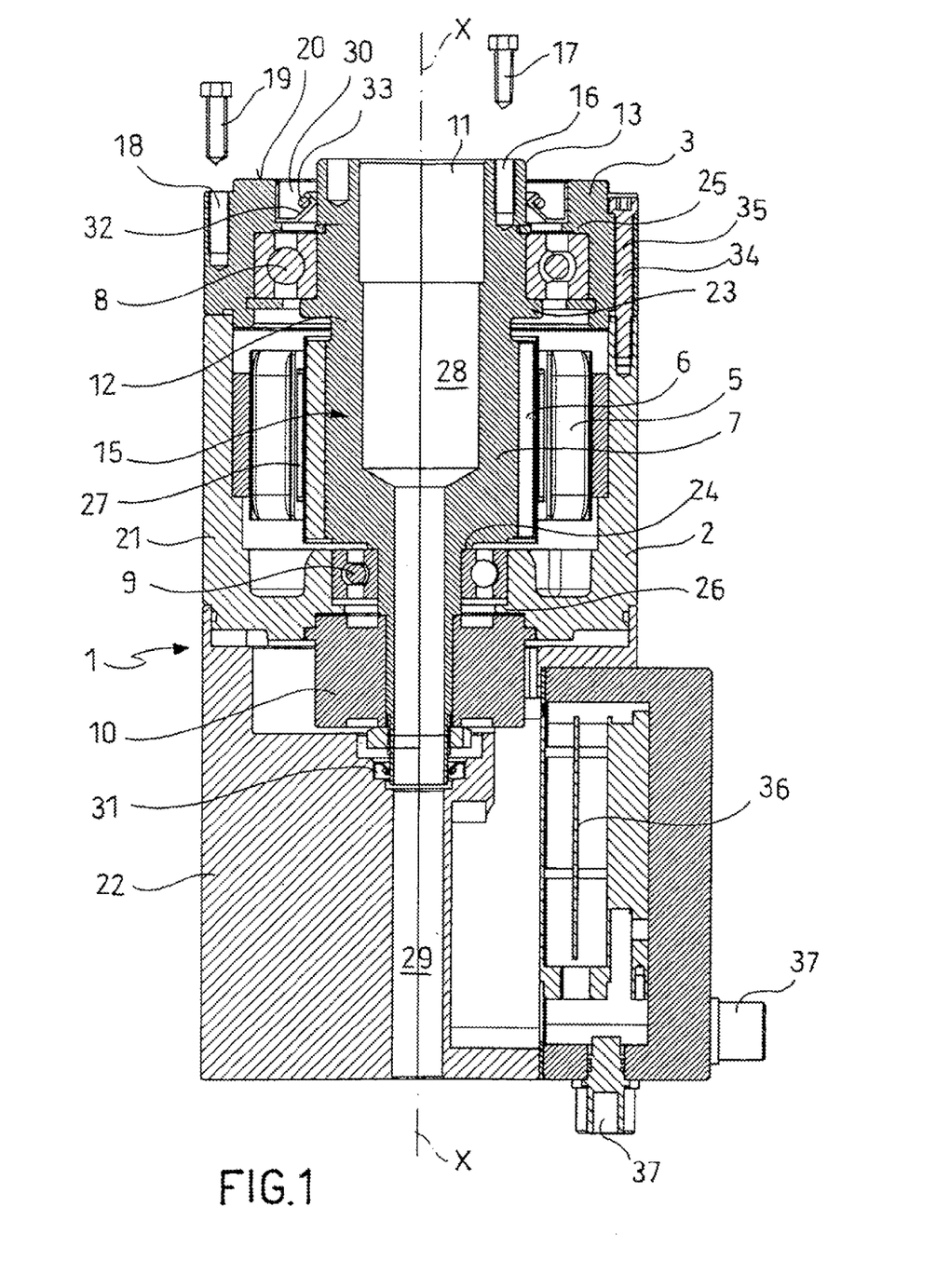
FIG. 1 is a longitudinal sectional view of a plate motor of a labelling machine according to the invention.
Figure 2:
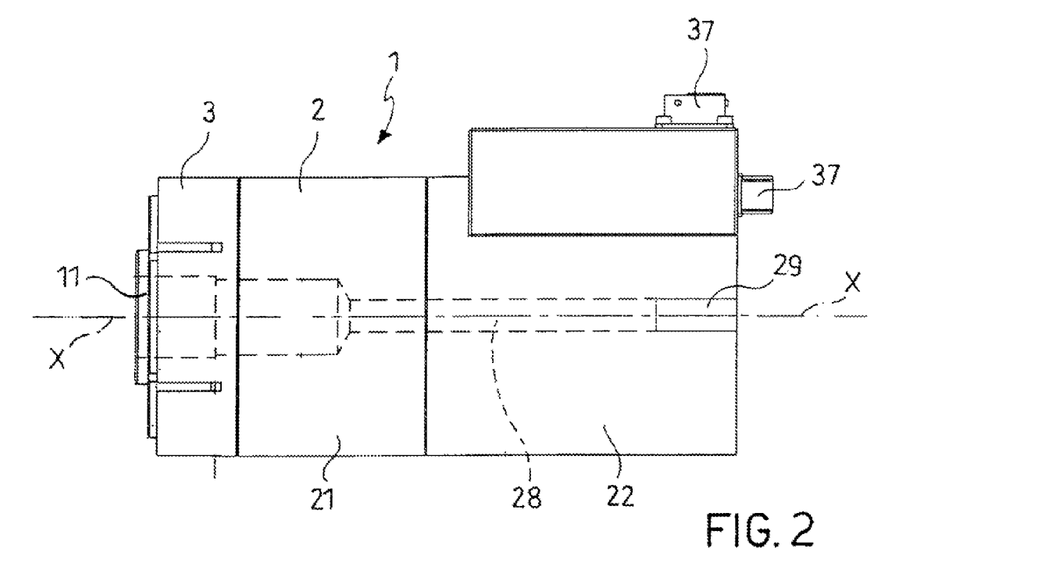
FIG. 2 is a side view of the motor from FIG. 1.
Figure 3:
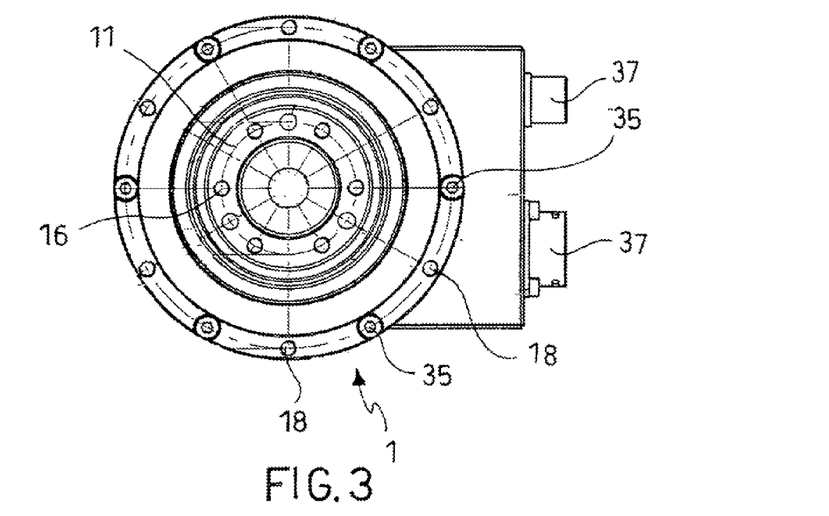
FIG. 3 is a top view of the motor from FIG. 1.
Figure 4:
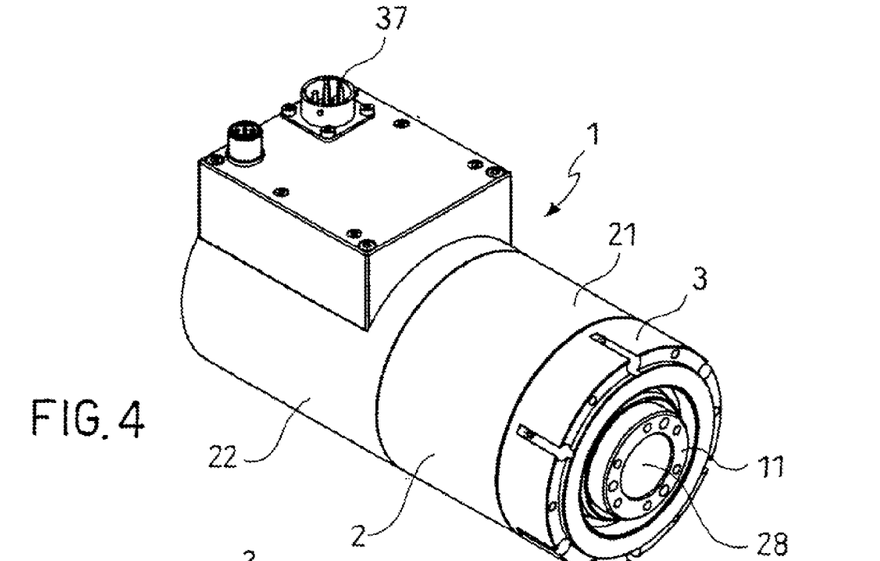
FIGS. 4 and 5 are perspective views of the motor of FIG. 1.
Figure 5:
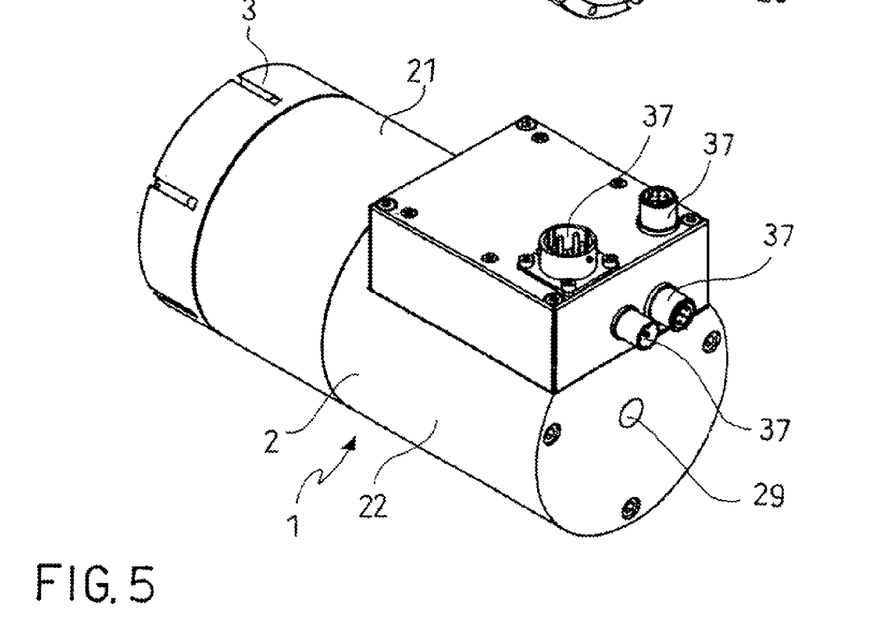
Figure 6:
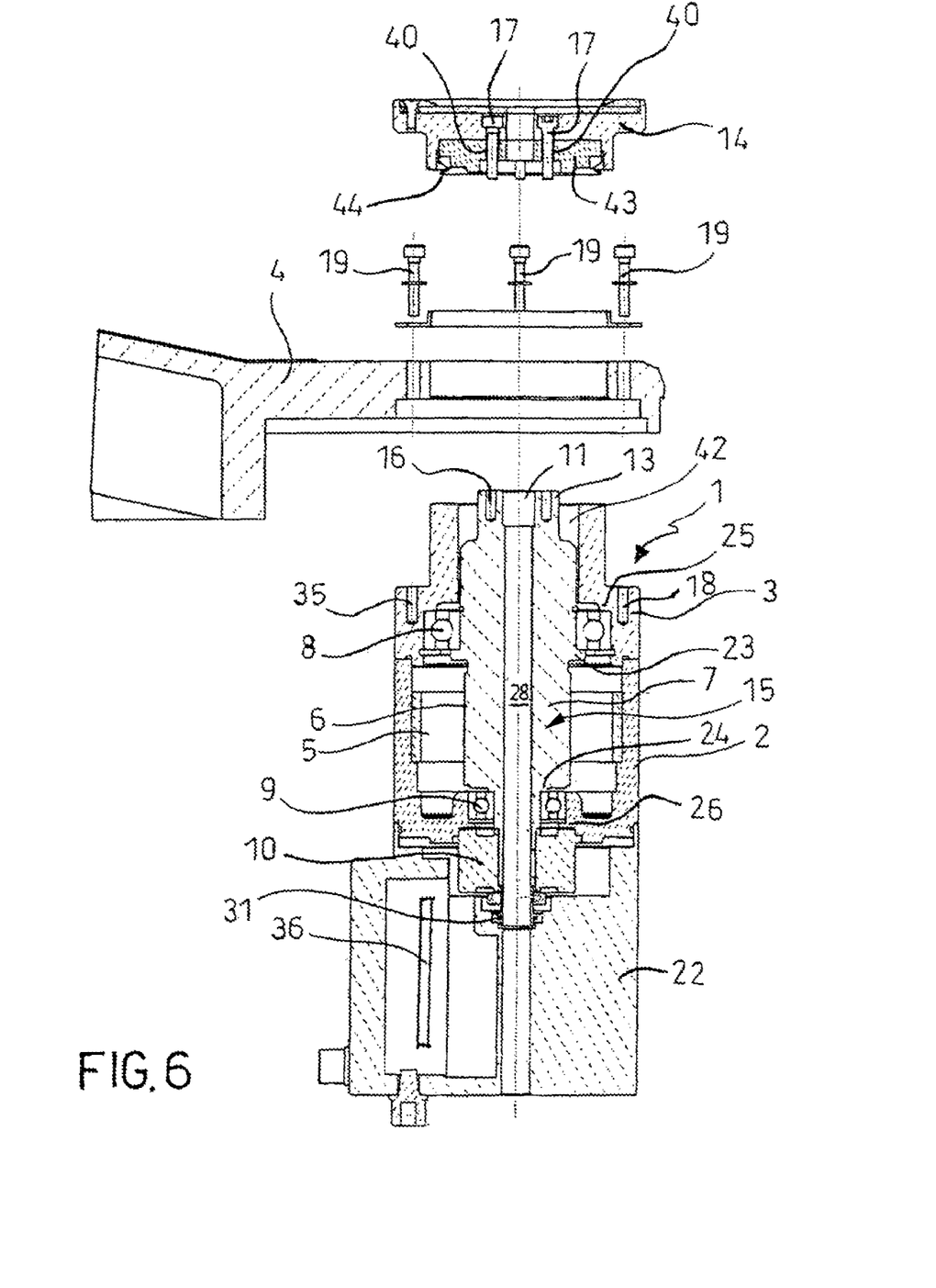
FIG. 6 is an exploded longitudinal sectional view of a motor-plate unit according to a preferred embodiment.
Figure 7:
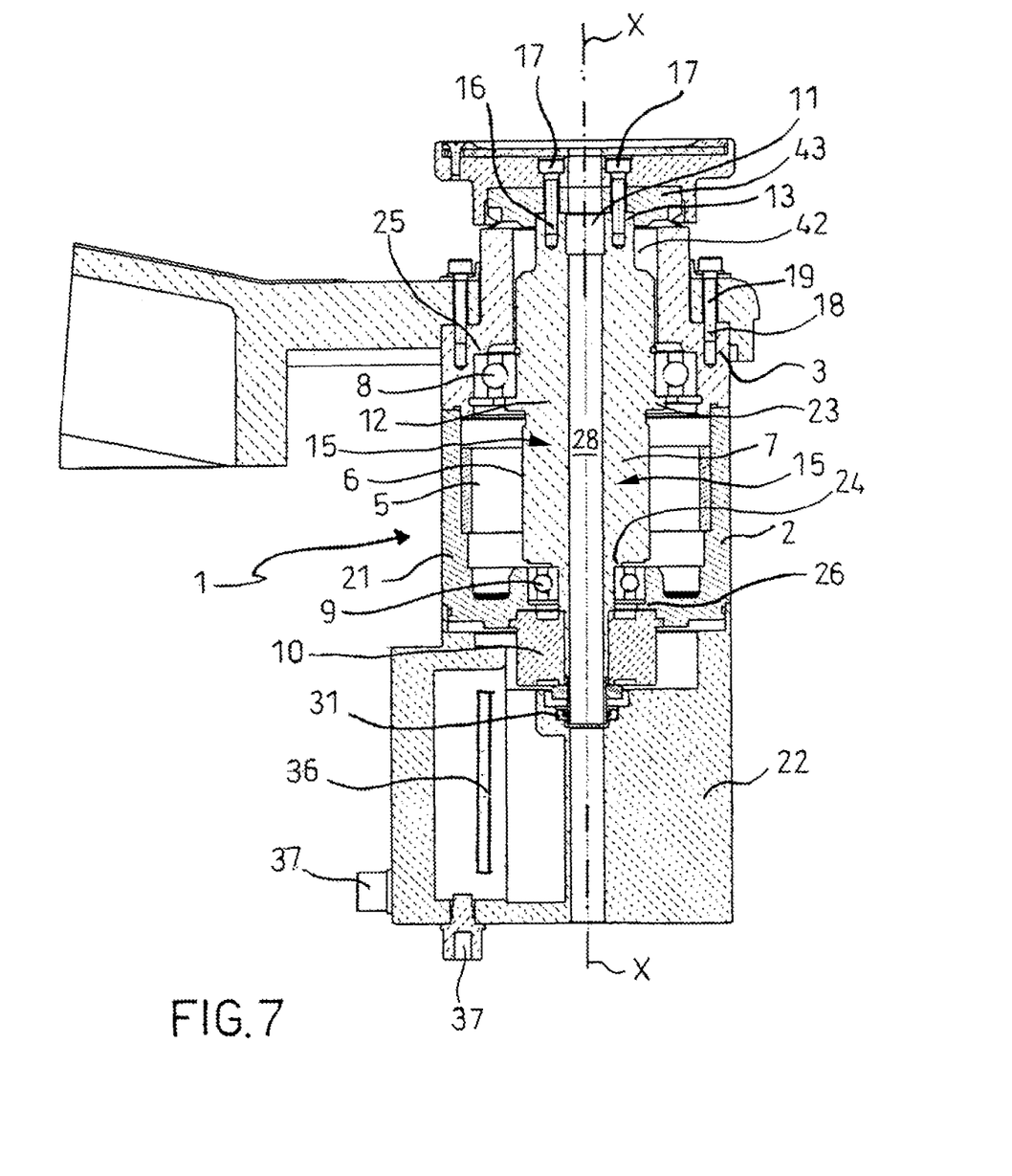
FIG. 7 is a longitudinal sectional view of the motor-plate unit from FIG. 6 as being assembled and joined to a carrousel of a labelling machine and FIG. 8 is a diagrammatic illustration of a labelling machine having a carousel carrying a number of the motor-plate units shown in the other figures.
Figure 8:
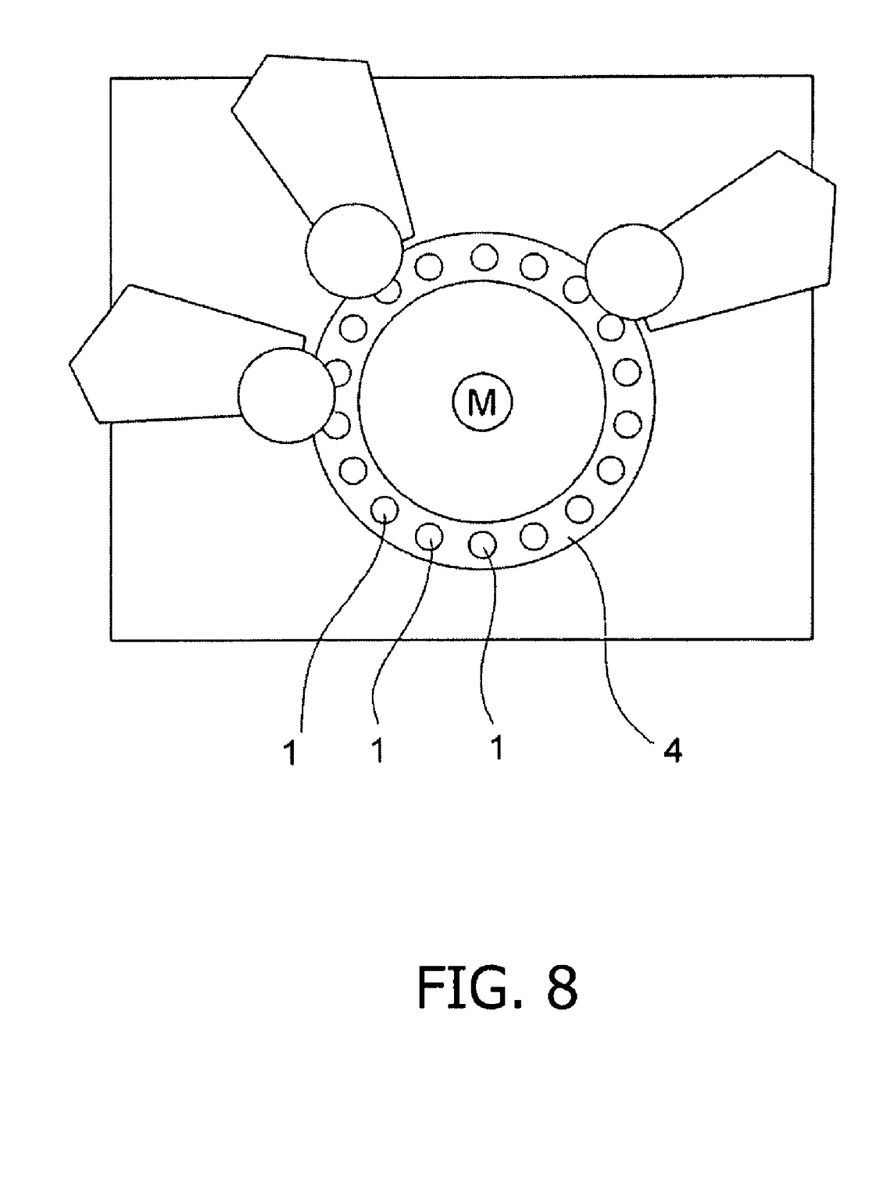

In accordance with an embodiment, the motor shaft 7, besides being hollow, is formed as one piece with the coupling flange 11, such as to provide a onebody tubular shaft-flange unit which is designated generally in FIGS. 1, 6 and 7 by reference numeral 15. This advantageously allows obviating the bulk and clearances that are necessarily linked to the prior art connection between the motor shaft and coupling flange. As the one-body shaft-flange unit acts both as the motor shaft and coupling flange, this coupling flange can be further completely omitted as a distinct component, and the precision processings of the bearing seats can be restrained only to one mechanical component, i.e. the shaft-flange unit 15. As the coupling flange as a distinct component is avoided, this advantageously allows also avoiding the requirement of connecting this component to the motor shaft and carrying out maintenance activities on this connection.

According to an embodiment, the coupling flange 11 portion of the shaft-flange unit 15 has a substantially annular shape, particularly that of a hollow cylinder, and defines said coupling seats, particularly a plurality of threaded coupling holes 16 that are preferably axial to the axis of rotation X and suitable to house coupling screws or pins 17 for directly coupling the plate 14 to the shaft-flange unit 15. The coupling screws or pins are preferably in direct contact with both the plate 14 and coupling flange 11 to provide a direct connection between the plate 14 and the coupling flange 11, i.e. the shaft-flange unit 15. Advantageously, the coupling holes 16 are formed in the cylindrical wall of the coupling flange 11 on a circumference coaxial with the axis of rotation X of the motor shaft portion 7.

To allow connecting the motor 1 to the carrousel 4 of the labelling machine, the connecting portion 3 of the housing 2 of the motor defines a plurality of connecting holes 18, which are preferably axially arranged relative to the axis of rotation X and suitable to house matching connecting screws 19 that are, according to an embodiment, accommodated within holes in the carrousel 4 and tightened in the connecting holes 18 of the motor. Advantageously, the connecting holes 18 are formed on the side of the motor on which the coupling flange (the motor "plate side", hereinafter) is also provided in a front surface 20 of the housing 2, which is intended to face the plate 14. In accordance with an embodiment, the connecting holes 18 are arranged on a circumference concentric with the axis of rotation X having a larger diameter than the circumference on which the coupling holes 16 of the coupling flange 11 are arranged.

In accordance with an embodiment, the housing 2 of motor 1 is divided into three main modules, which are separately fabricated and then joined upon assembly of the motor. The three modules comprise a base portion 21 arranged at the rotor 6 and carrying the stator 5 of the motor, said connecting portion 3, being connected to the base portion 21 on the plate side of the motor and a control portion 22 which accommodates conductors or electronic control circuits for the motor and comprises one or more electrical connectors that are connected to these circuits or internal conductors and suitable to receive matching connecting pins from the outside. The control portion 22 is connected to the base portion 21 on the side opposite the connecting portion 3 (hereinafter referred to as the motor "rear side").

As the housing 2 is divided in three modules, the base portion 21 can be manufactured in large series and combined with one of several connecting portions (according to the several types of carrousels to which the user desires to apply the motor) and one of several control portions (which are arranged and shaped according to the particular requirements of control, space and access side of the outer electrical connectors).

According to an embodiment, the connecting portion is screwed to the base portion by means of screws 34 that can be fitted within seats 35 (through holes) that are formed in the connecting portion 3. Said seats 34 are formed on the same circumference on which said connecting holes 18 are formed, and are arranged alternated therewith.

In accordance to an embodiment, the motor 1 comprises a first bearing 8, which supports the shaft-flange unit within the housing in the vicinity of the coupling flange, particularly, the first bearing is splined between the coupling flange 11 of the shaft-flange unit 15 and the connecting portion 3 of the housing 2. At least one, preferably two second bearings 9, 10 is further provided to support the shaft-flange unit 15 within the housing in a position opposite the first bearing 8 relative to the rotor 6. Particularly, the second bearings 8, 9 are splined between the shaft 7 of the shaft-flange unit 15 and the base portion 21 of the housing 2.

Advantageously, at the first bearing 8, the flange-shaft unit 15 has a larger diameter than its diameter at the second bearing/s 9, 10 and, preferably, the first bearing 8 is a roller bearing whereas the second bearings comprise a second roller bearing 9 having a smaller diameter than the first roller bearing 8, and a second sliding bearing 10 having a lower diameter than the first roller bearing 8 and being arranged on the rear side of the second roller bearing 9.

In order to ensure a sufficient axial support to the motor shaft 7 (which is particularly important in the instant case, as the motor also acts as the axial support for the weight of the plate and container supported thereby), the shaft-flange unit 15 comprises a first annular abutment flange 23 which axially abuts against the first bearing 8, and a second annular abutment flange 24, which axially abuts against the second roller bearing 9 in the opposite direction to the first abutment flange 23, such as to axially lock the shaft-flange unit 15 between the two bearings 8, 9. The two bearings 8, 9 are, in turn, axially locked within the housing, due to a first abutment shoulder 25, which is axially abutted against the first bearing 8 in the opposite direction to the first abutment flange 23 of the shaft-flange unit and a second abutment shoulder 26 which axially abuts against the second bearing 9 in an opposite direction to the second abutment flange 24 of the shaft-flange unit.

In order to obtain a sufficiently high torque and a sufficiently rigid transmission for being able to directly operate the plate, the annular gap 27 between the stator 5 and rotor 6 of the motor has a larger average diameter than the diameter of the circumference on which the coupling holes 16 of the coupling flange 11 have been arranged. With further advantage in terms of rigidity and promptness of the direct motion transmission from the motor to the plate and positioning of the container to be labelled relative to a labelling station associated with the carrousel, the annular gap 27 of the motor has a lower average diameter than the diameter of the circumference on which there are arranged the connecting holes 18 of the connecting portion 3 of the housing 2, and thus, of the circumference on which the connection takes place between the motor and carrousel.

In accordance with an embodiment, the shaft-flange unit 15 is substantially tapered in a stepped manner from the coupling flange 11 to the rear side thereof, except for the shoulders or flanges at the bearings 8, 9. Advantageously, the through opening 28 is also tapered substantially in a stepped manner along the shaft-flange unit 15 from the coupling flange 11 to the rear side thereof. This implies a reduction in the polar inertia momentum of the shaft-flange unit, with the diameter being equal, and a maximum polar inertia momentum at the coupling flange 11, and thus in that point where the rotary motion is transmitted by the motor to the container to be labelled. Furthermore, the through opening 28 also has its maximum width at the coupling flange 11, such that the (usually large) active portions of the accessories or alignment means can be at least partially accommodated within the coupling flange. This entails a further reduction in the axial bulk of the motor-plate assembly.

In the embodiment illustrated for example in FIG. 1, the shaft-flange unit 15 does not extend to the rear side of the control portion 22 of the motor. However, in order to cause the alignment means or other accessories to pass through the motor to the bottle bottom, the control portion 22 defines a through channel 29 therein, which is aligned with the through opening 26 of the shaft-flange unit 15 and suitable to provide the through opening of the motor 1 together with it.

In view of the inevitable situation in which a container to be labelled is broken or however loses a part of its liquid or powder contents, the motor 1 advantageously comprises a first gasket 30 that is arranged between the housing (connecting portion 3) and the coupling flange 11 of the shaft-flange unit 15 and a second gasket 31 that is arranged between the housing (control portion 22) and the rear end of the shaft-flange unit 15 opposite the coupling flange. Advantageously, each of the gaskets 28, 29 comprises an annular lip 32 provided with an annular seat housing a clamping ring 33 (such as an O-ring) suitable to bias the annular lip 32 radially in contact with the shaft-flange unit.

FIGS. 6 and 7 show a further preferred embodiment (those components and elements which are identical and/or similar to those described with reference to the above embodiments are designated with the same numerals). In this embodiment, the shaft-flange unit 15 is also tubular and defines therein the through opening 28 that is co-axial with the axis of rotation X and preferably has a substantially uniform diameter throughout the length of the motor shaft 7, except for a widened portion arranged at the coupling flange 11.

The coupling flange 11 of the shaft-flange unit 15 has a substantially annular shape, particularly that of a hollow cylinder, and defines the coupling seats, particularly two or more threaded coupling holes 16, which are axial to the axis of rotation X and suitable to house the coupling screws 17 for directly coupling the plate 14 to the shaft-flange unit 15. Advantageously, the coupling holes 16 are formed in the cylindrical wall of the coupling flange 11 on a circumference coaxial with the axis of rotation X of the motor shaft 7.

A plate support 43 is interposed between the coupling flange 11 and the plate 14. This plate support has the function of adaptor and/or support and/or spacer and/or rotational locking element between the coupling flange 11 and the plate 14.

According to an embodiment, the plate support 43 is substantially disc-shaped with one or more through holes 40 for allowing the coupling screws 17 to pass therethrough, which hold the plate support in the desired position between the connecting flange and the plate.

In accordance with a further embodiment (not shown in the figures), the plate support 43 further defines one or more additional holes that accommodate suitable secondary coupling screws that are only intended for connecting the plate support 43 to the coupling flange.

The plate support 43 is at least partially housed in a seat of the plate 14 and advantageously covers a gap 42 formed between the coupling flange 11 and the motor housing 2. In order to prevent impurities (such as the contents of bottles or other containers broken during labelling) from entering therein, the plate support 43 comprises a circumferential gasket, such as a lip ring 44, which slides on the motor housing about the gap 42.

Advantageously, the plate support 43 and plate 14 also define a through opening 45, which is preferably central and arranged at the through opening 28 of the shaft-flange unit 15 in order to allow the alignment means having access, through the motor, to the bottom of the container to be labelled.

The motor for plates according to the present invention allows overcoming all the drawbacks mentioned above with reference to the prior art and has a number of further advantages.

Particularly, by passing through the motor shaft, the through opening avoids the difficulty of placing further accessories in the vicinity of the bottle to be labelled and contributes to a further reduction in the bulk of the labelling machine.

Finally, the one-body shaft-flange unit together with the direct coupling of the plate to the motor shaft via the coupling screw(s) in direct contact both with the plate and coupling unit provides the plate motor unit with a solid and very compact structure, and allows for a rigid and immediate torque transmission from the motor to the plate.

The characteristics of the plate motor further allow the same to be connected to the carrousel in a simple and rigid manner, as well as a reduction in the manufacture, assembly, mounting and maintenance costs and time.

What is claimed is:

1. A motor-plate unit for rotary labelling machines comprising:
   a motor for a plate of a labelling machine, said motor including:
   a housing provided with one or more connecting portions for connecting the motor to a carrousel of the labelling machine;
   a motor shaft being pivotally supported within the housing;
   a coupling flange having a first end connected to said motor shaft and a second end that can be connected to said plate,
   wherein the motor shaft is hollow, defining a through opening to allow alignment means or other accessories to have access to the plate through the motor,
   the motor-plate unit further comprising a plate suitable to support a container to be labelled, said plate being connected to the coupling flange of said motor, said plate having a central through opening aligned with the through opening of the hollow shaft, a first bearing supporting the shaft-flange unit within the housing in the vicinity of the coupling flange, and one or more second bearings supporting the shaft-flange unit within the housing in a position opposite the first bearing relative a rotor connected to the motor shaft, wherein the shaft-flange unit comprises a first abutment flange which is axially abutted against the first bearing and a second abutment flange which is axially abutted against the second bearing in the opposite direction to the first abutment flange, and wherein the housing comprises a first abutment shoulder which is axially abutted against the first bearing in the opposite direction to the first abutment flange and a second abutment shoulder which is axially abutted against the second bearing in a direction opposite the second abutment flange, such as to axially lock the shaft-flange unit relative to the housing.

2. A motor-plate unit for rotary labelling machines comprising:
   a motor for a plate of a labelling machine, said motor including:
   a housing provided with one or more connecting portions for connecting the motor to a carrousel of the labelling machine;
   a motor shaft being pivotally supported within the housing;
   a coupling flange having a first end connected to said motor shaft and a second end that can be connected to said plate,
   wherein the motor shaft is hollow, defining a through opening to allow alignment means or other accessories to have access to the plate through the motor,
   the motor-plate unit further comprising a plate suitable to support a container to be labelled, said plate being connected to the coupling flange of said motor, said plate having a central through opening aligned with the through opening of the hollow shaft
   the annular gap between the stator and rotor of the motor has a smaller average diameter than the diameter of the circumference on which the connecting holes of the connecting portion of the housing are arranged, and wherein
   said shaft-flange unit is tapered substantially in a stepped manner from the coupling flange to an opposite side thereof, except for shoulders or flanges that may be provided at the bearings.

3. The motor-plate unit according to claim 2, wherein said motor shaft and said coupling flange are formed as one piece such as to form a one-body shaft-flange unit.

4. The motor-plate unit according to claim 2, wherein said coupling flange of the shaft-flange unit comprises a plurality of coupling holes that are suitable to house pins or screws for directly coupling the plate to the shaft-flange unit.

5. The motor-plate unit according to claim 4, wherein said coupling holes are arranged on a circumference coaxial with an axis of rotation of the motor shaft.

6. The motor-plate unit according to claim 2, wherein said connecting portion defines a plurality of connecting holes suitable to house matching screws for connecting the motor to said carrousel.

7. The motor-plate unit according to claim 6, wherein said coupling flange of the shaft-flange unit comprises a plurality of coupling holes that are suitable to house pins or screws for directly coupling the plate to the shaft-flange unit, said coupling holes being arranged on a circumference coaxial with an axis of rotation of the motor shaft and wherein said connecting holes are arranged on a circumference coaxial with the axis of rotation of the motor shaft having a larger diameter than the circumference on which the coupling holes of the coupling flange are arranged.

8. The motor-plate unit according to claim 2, comprising:
   a first bearing supporting the shaft-flange unit within the housing in the vicinity of the coupling flange; and
   one or more second bearings supporting the shaft-flange unit within the housing in a position opposite the first bearing relative a rotor connected to the motor shaft.

9. The motor-plate unit according to claim 8, wherein, at the first bearing, said shaft-flange unit has a larger diameter than its diameter at the at least one second bearing.

10. The motor-plate unit according to claim 2, wherein the annular gap between the stator and rotor of the motor has a larger average diameter than the diameter of the circumference on which the coupling holes of the coupling flange are arranged.

11. The motor-plate unit according to claim 2, wherein said through opening has a substantially even diameter except for a portion that is widened at the coupling flange.

12. The motor-plate unit according to claim 2, wherein said housing comprises:
   a base portion carrying the stator of the motor;
   said connecting portion being fabricated distinct from the base portion and subsequently connected thereto on the coupling flange side; and
   a control portion accommodating electronic control circuits for the motor and comprises one or more electrical connectors that are connected to the circuits and suitable to receive connecting pins from the outside, said control portion being fabricated distinct from the base portion and subsequently connected thereto on the side opposite the coupling flange.

13. A motor-plate unit for rotary labelling machines comprising:
   a motor for a plate of a labelling machine, said motor including:
   a housing provided with one or more connecting portions for connecting the motor to a carrousel of the labelling machine;
   a motor shaft being pivotally supported within the housing;
   a coupling flange having a first end connected to said motor shaft and a second end that can be connected to said plate,
   wherein the motor shaft is hollow, defining a through opening to allow alignment means or other accessories to have access to the plate through the motor,
   the motor-plate unit further comprising a plate suitable to support a container to be labelled, said plate being connected to the coupling flange of said motor, said plate having a central through opening aligned with the through opening of the hollow shaft
   a base portion carrying the stator of the motor;
   said connecting portion being fabricated distinct from the base portion and subsequently connected thereto on the coupling flange side; and
   a control portion accommodating electronic control circuits for the motor and comprises one or more electrical connectors that are connected to the circuits and suitable to receive connecting pins from the outside, said control portion being fabricated distinct from the base portion and subsequently connected thereto on the side opposite the coupling flange,
   wherein said control portion defines a through channel therein, which is aligned with the through opening of the motor shaft.

* * * * *